United States Patent
Nishizawa

(10) Patent No.: US 9,191,552 B2
(45) Date of Patent: Nov. 17, 2015

(54) IMAGE PROCESSING APPARATUS THAT PERFORMS COLOR CONVERSION AND IMAGE PROCESSING METHOD

(71) Applicant: KYOCERA Document Solutions Inc., Osaka (JP)

(72) Inventor: Akira Nishizawa, Osaka (JP)

(73) Assignee: KYOCERA Document Solutions Inc. (JP)

( * ) Notice: Subject to any disclaimer, the term of this patent is extended or adjusted under 35 U.S.C. 154(b) by 15 days.

(21) Appl. No.: 14/091,425

(22) Filed: Nov. 27, 2013

(65) Prior Publication Data

US 2014/0153824 A1 Jun. 5, 2014

(30) Foreign Application Priority Data

Nov. 30, 2012 (JP) ................... 2012-263436
Nov. 30, 2012 (JP) ................... 2012-263437

(51) Int. Cl.
*G06T 7/40* (2006.01)
*H04N 1/60* (2006.01)

(52) U.S. Cl.
CPC ................... *H04N 1/6016* (2013.01)

(58) Field of Classification Search
CPC . H04N 1/6058; H04N 1/6027; H04N 1/4052; H04N 1/6016
USPC ........... 382/166, 167; 348/582, 589; 358/3.03
See application file for complete search history.

(56) References Cited

U.S. PATENT DOCUMENTS

| 7,024,052 B2* | 4/2006 | Hirase | 382/281 |
| 2003/0021470 A1* | 1/2003 | Kakutani | 382/162 |
| 2004/0109604 A1* | 6/2004 | Kagawa et al. | 382/167 |
| 2004/0201593 A1* | 10/2004 | Nishimura et al. | 345/591 |
| 2006/0285760 A1* | 12/2006 | Malvar | 382/248 |
| 2008/0018561 A1* | 1/2008 | Song et al. | 345/60 |
| 2010/0134550 A1* | 6/2010 | Ito et al. | 347/15 |
| 2011/0298857 A1* | 12/2011 | Maki | 347/15 |
| 2012/0194539 A1* | 8/2012 | Zhang | 345/590 |
| 2014/0153054 A1* | 6/2014 | Nishizawa | 358/3.03 |

FOREIGN PATENT DOCUMENTS

| JP | 03-050960 | 3/1991 |
| JP | 09-098290 A | 4/1997 |
| JP | 11-261819 A | 9/1999 |
| JP | 2001-053969 A | 2/2001 |
| JP | 2010-259111 A | 11/2010 |

* cited by examiner

*Primary Examiner* — Mekonen Bekele
(74) *Attorney, Agent, or Firm* — McDonnell Boehnen Hulbert & Berghoff LLP

(57) ABSTRACT

An image processing apparatus in the present disclosure includes a color conversion processing unit, a modulation candidate creating unit, a color value modulating unit, and an output unit. The color conversion processing unit performs color conversion from an input color value of a target image to a corresponding output color value to obtain a tentative output color value. The modulation candidate creating unit creates, as modulation candidates, combinations of integer values obtained by rounding up or down the decimal fraction of each color component of a tentative output color value. The color value modulating unit selects a modulation candidate at random and performs modulation by replacing the tentative output color value with the selected modulation candidate. The output unit outputs the target image according to the color value obtained after the modulation.

14 Claims, 6 Drawing Sheets

IMAGE PROCESSING APPARATUS THAT PERFORMS COLOR CONVERSION AND IMAGE PROCESSING METHOD

RELATED APPLICATIONS

This application is based upon, and claims the benefit of priority from, corresponding Japanese Patent Application No. 2012-263436 filed in the Japan Patent Office on Nov. 30, 2012 and Japanese Patent Application No. 2012-263437 filed in the Japan Patent Office on Nov. 30, 2012, the entire contents of each which are incorporated herein by reference.

BACKGROUND

Unless otherwise indicated herein, the description in this section is not prior art to the claims in this application and is not admitted to be prior art by inclusion in this section.

Typical image forming apparatuses, such as printers and multi-function peripherals ("MFPs"), use a pulse-surface-area modulation method or a pseudo modulation method (e.g. ordered dithering method, error diffusion method, or the like), in which a multi-valued color is artificially represented with a set of dots, to perform an image process.

In this image process, however, if the number of gradation steps is limited, for example, to improve stabilization, a visual discontinuity may occur in the image. This visual discontinuity may cause so-called "contouring," significantly reducing image quality.

To solve this problem of contouring, various technologies have been proposed. For example, to perform correction mainly to improve gradation characteristics, noise is added to a portion at which continuity is lost in input/output characteristics or a reference value in an error diffusion method is changed.

However, contouring may appear when the same color value continues in a certain area. It is not possible to prevent this contouring efficiently with the above technology.

In other words, it has not been possible to solve the problem that contouring occurs when the same color value continues with the above technology.

If correction or process is performed more than necessary to prevent contouring, there has been a risk that image quality would be lowered.

The present disclosure relates to an image processing apparatus that prevents the occurrence of contouring by irregularly performing fine modulation on tentative output color values obtained by color conversion without impairing image quality.

SUMMARY

An image processing apparatus in an aspect of the present disclosure includes a color conversion processing unit, a modulation candidate creating unit, a color value modulating unit, and an output unit. The color conversion processing unit performs color conversion from an input color value of a target image to a corresponding output color value to obtain a tentative output color value. The modulation candidate creating unit creates modulation candidates. The modulation candidates include combinations of integer values obtained by rounding up or down the decimal fraction of each color component of the tentative output color value. The color value modulating unit selects a modulation candidate at random and replaces the tentative output color value with the selected modulation candidate. The output unit outputs the target image according to the color value obtained after the modulation.

An image processing apparatus in another aspect of the present disclosure includes a color conversion processing unit, a color value modulating unit, and an output unit. The color conversion processing unit performs color conversion from an input color value of a target image to a corresponding output color value to obtain a tentative output color value. The color value modulating unit modulates the tentative output color value to integer values by rounding up or down the decimal fraction of each color component of the tentative output color value according to a probability determined from the decimal fraction. The output unit outputs the image according to the color value obtained after the modulation.

An image processing method in another aspect of the present disclosure is executed to perform color conversion from an input color value of a target image to a corresponding output color value to obtain a tentative output color value, to create, as modulation candidates, combinations of integer values obtained by rounding up or down the decimal fraction of each color component of the tentative output color value, to select a modulation candidate at random and perform modulation by replacing the tentative output color value with the selected modulation candidate, and to output the image according to the color value obtained after the modulation.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

All drawings are intended to illustrate some aspects and examples of the present disclosure. The drawings described are only schematic and are non-limiting, and are not necessarily drawn to scale.

DETAILED DESCRIPTION

Example apparatuses and methods are described herein. Other example embodiments or features may further be utilized, and other changes may be made, without departing from the spirit or scope of the subject matter presented herein. In the following detailed description, reference is made to the accompanying drawings, which form a part thereof FIG. 1 shows a block diagram that illustrates a configuration of an image processing apparatus in an embodiment of the present disclosure.

Figure 1:
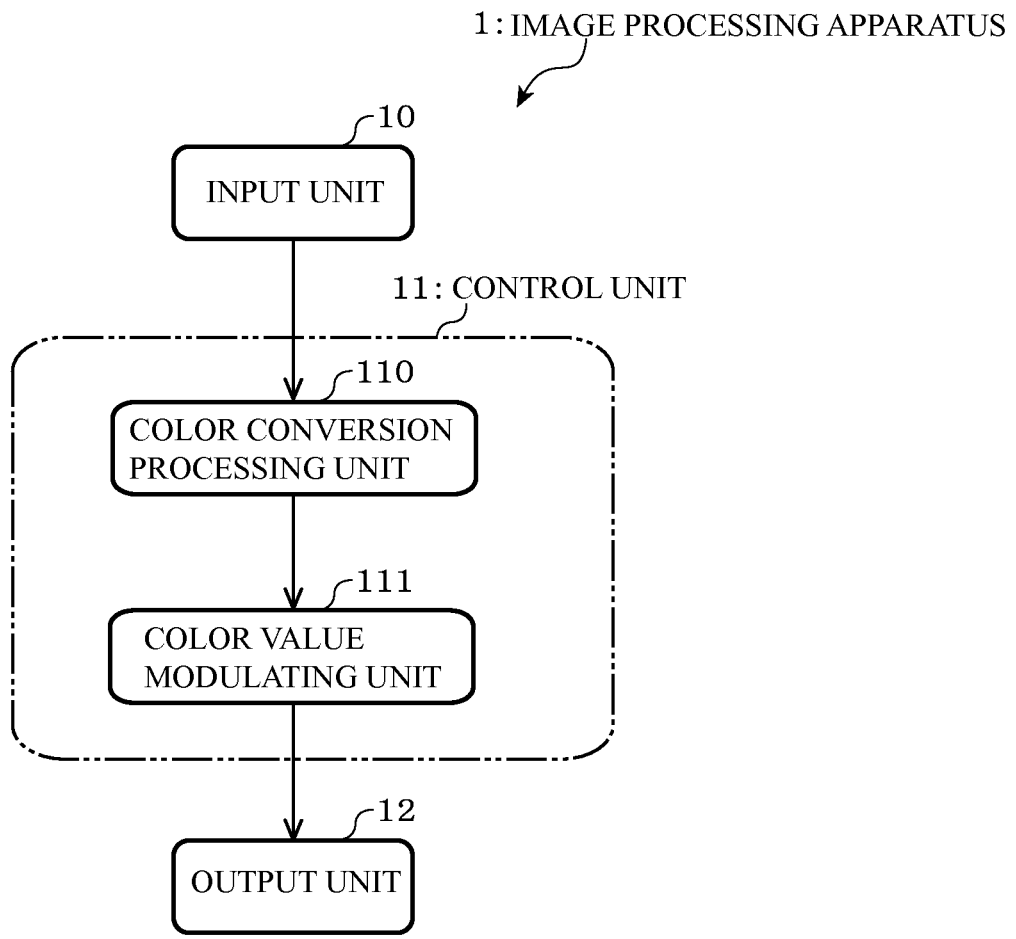
FIG. 1 shows a block diagram that illustrates a configuration of an image processing apparatus in an embodiment of the present disclosure.

The image processing apparatus 1 in this embodiment illustrated in FIG. 1 includes an input unit 10, a control unit 11, and an output unit 12. The input unit 10 accepts a target image. The control unit 11 performs an image process on the accepted target image. The output unit 12 produces a printout or another output according to the image on which the image process has been performed by the control unit 11. The image processing apparatus 1 in this embodiment is, for example, a color printer, a multi-function peripheral ("MFP"), or another image forming apparatus.

The image process performed by the control unit 11 includes a process to perform color conversion from an input color value of the target image to an output color value and a process to create a dot image in the above-mentioned pulse-surface-area modulation method or a similar method.

More specifically, in the image process, print data is accepted from, for example, a personal computer and is interrupted to perform color conversion from an RGB value (input color value) assigned to an object to a corresponding CMYK value (output color value). A dot image is then created through a rasterization process, a screen process, or the like. Next, a print process is performed by applying toners in cyan ("C"), magenta ("M"), yellow ("Y"), and black ("K") to the created dot image.

I. First Embodiment

Figure 2:
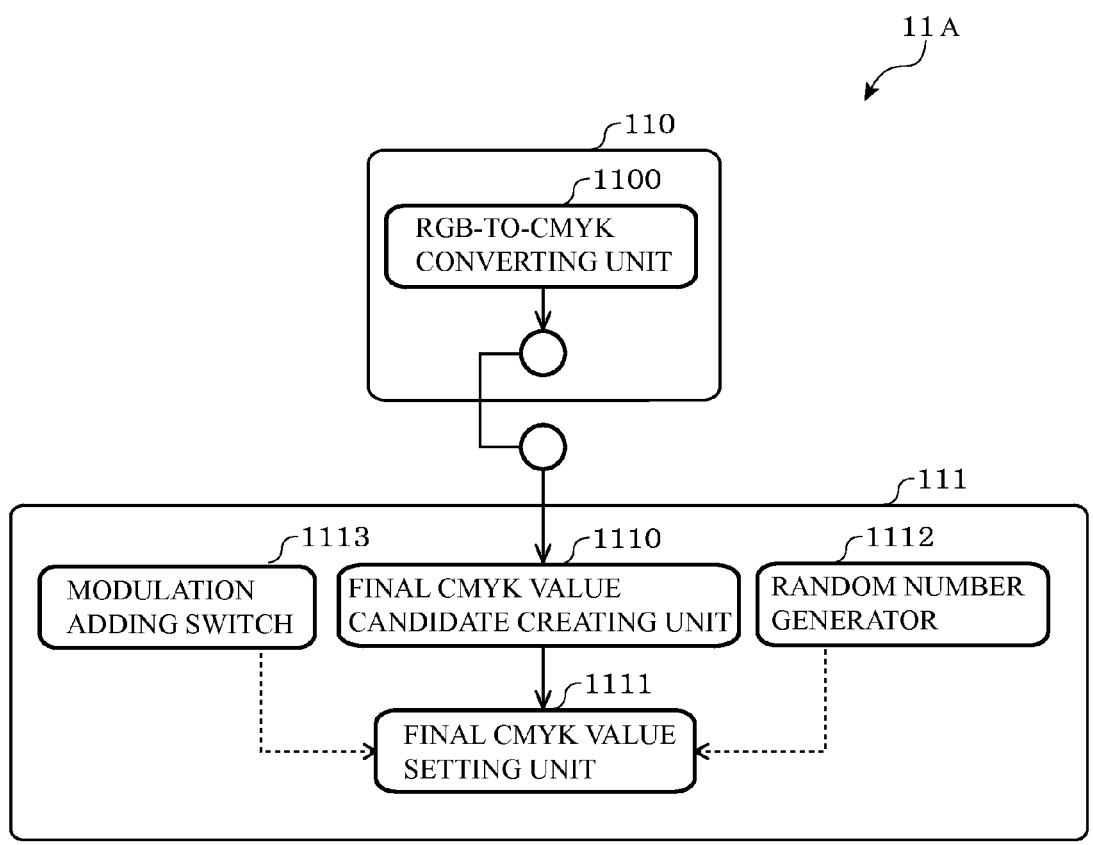
FIG. 2 shows a block diagram that illustrates a functional configuration of an image processing apparatus in a first embodiment of the present disclosure.

FIG. 2 shows a functional block diagram that illustrates an image processing apparatus in a first embodiment of the present disclosure.

The control unit 11A in this embodiment illustrated in FIGS. 1 and 2 includes a color conversion processing unit 110 and a color value modulating unit 111. The color conversion processing unit 110 performs color conversion from an input color value of a target image to a corresponding output color value to obtain a tentative output color value.

The color value modulating unit 111 performs color conversion on the tentative output color value by rounding up or down the fractional part of each of the color components of the tentative output color value.

The color conversion processing unit 110 includes an RGB-to-CMYK converting unit 1100. The RGB-to-CMYK converting unit 1100 converts a color corresponding to a color value (RGB value) of each pixel in the input image to a color value (CMYK value) in a reproducible output format. Specifically, the RGB-to-CMYK converting unit 1100 prestores a look-up table ("LUT"), which is represented in a three-dimensional orthogonal grid shape by grid points equivalent to correspondences between RGB values and CMYK values. The RGB-to-CMYK converting unit 1100 performs color conversion from the RGB value of a target pixel to its corresponding CMYK value with reference to this LUT. For RGB values positioned at coordinates between grid points, their corresponding CMYK values are obtained by known interpolation calculation.

A CMYK value at each grid point and CMYK values at coordinates between grid points are defined as decimal fractions, so neither rounding process for decimal fractions nor integer definition are carried out.

Output color values (CMYK values) that are obtained as a result of color conversion but have not undergone modulation will be referred to as tentative output color values (tentative CMYK values).

The color value modulating unit 111 includes a final CMYK value candidate creating unit 1110, a final CMYK value setting unit 1111, a random number generator 1112, and a modulation adding switch 1113.

The final CMYK value candidate creating unit (modulation candidate creating unit) 1110 creates, as modulation candidates, combinations of integer values obtained by rounding up or down the decimal fraction of each color component of a tentative output color value.

If, for example, the tentative output color value {C, M, Y, K} is {125.5, 133.2, 234.8, 58.1}, it is separated into an integer part {125, 133, 234, 58} and a fractional part {0.5, 0.2, 0.8, 0.1}. Combinations of integer values are then obtained by rounding up the fractional part of each of C, M, Y, K and adding one to the relevant integer part or by rounding down the fractional part and leaving the integer value unchanged. As a result, the following 16 (=$2^4$) modulation candidates are created.

{125, 133, 234, 58}, {125, 133, 234, 59}, {125, 133, 235, 58}, {125, 133, 235, 59}, {125, 134, 234, 58}, {125, 134, 234, 59}, {125, 134, 235, 58}, {125, 134, 235, 59}, {126, 133, 234, 58}, {126, 133, 234, 59}, {126, 133, 235, 58}, {126, 133, 235, 59}, {126, 134, 234, 58}, {126, 134, 234, 59}, {126, 134, 235, 58}, {126, 134, 235, 59}

To obtain modulation candidates, instead of performing both rounding-up and rounding-down of fractional parts in this way, it is also possible to obtain rounded-up values and obtain other modulation candidates by subtracting one of the rounded-up values. Similarly, it is also possible to obtain rounded-down values and obtain other modulation candidates by adding one to the rounded-down values.

The final CMYK value candidate creating unit 1110 stores the created modulation candidates.

The final CMYK value setting unit (color value modulating unit) 1111 selects one of the modulation candidates created by the final CMYK value candidate creating unit 1110 at random. The final CMYK value setting unit (color value modulating unit) 1111 then performs modulation by replacing the tentative output color value with the selected modulation candidate.

For example, the final CMYK value candidate creating unit 1110 prestores correspondences between the 16 modulation candidates and random numbers that can be generated by the random number generator 1112 or their numerical range. The final CMYK value candidate creating unit 1110 then obtains, from these correspondences, a modulation candidate corresponding to a random number actually obtained from the random number generator 1112 and replaces the tentative output color value with the modulation candidate.

As a result, a value is obtained by individually adding one to the values of C, M, Y, and K of the original tentative CMYK value or leaving their original integer values unchanged. The obtained value is output to the output unit 12.

The output unit 12 outputs the relevant image according to the color value obtained after the modulation performed in this way.

The modulation adding switch 1113 determines whether or not to perform modulation in response to a user setting The modulation adding switch 1113 outputs a setting signal to the final CMYK value setting unit 1111.

If the final CMYK value setting unit 1111 receives, from the modulation adding switch 1113, a signal indicating that modulation is not to be performed, the final CMYK value setting unit 1111 outputs the original tentative CMYK value, which has not undergone modulation, to the output unit 12 without alternation. This can also be achieved when the final CMYK value candidate creating unit 1110 performs control so that a modulation candidate is not created.

In this case, the color value modulating unit 111 does not perform modulation, and the output unit 12 outputs the relevant image according to the tentative output color value.

This arrangement is convenient if modulation is not effective because, for example, modulation performed at the expense of image quality is not advantageous in a case in which the occurrence of contouring is not assumed. Another possible reason for ineffective modulation is that a reduction in compression ratio due to discontinuity of the same color value is not desirable.

As described above, to modulate a tentative CMYK value, the image processing apparatus 1 in the first embodiment of the present disclosure performs a rounding process to round up or down a decimal fraction at random for each of C, M, Y, and K of the tentative CMYK value to change the color value.

Since consecutive output color values are changed to fine ranged randomized color values, it is possible to prevent the occurrence of contouring efficiently, which would otherwise be generated with the same consecutive color values.

Since color values are modulated according to a value equivalent to the minimum resolution of the output color value, a tradeoff between the prevention of contouring and lower image quality can also be eliminated.

The image processing apparatus 1 in this embodiment can prevent the occurrence of contouring efficiently without lowering image quality.

II. Second Embodiment

Figure 3:
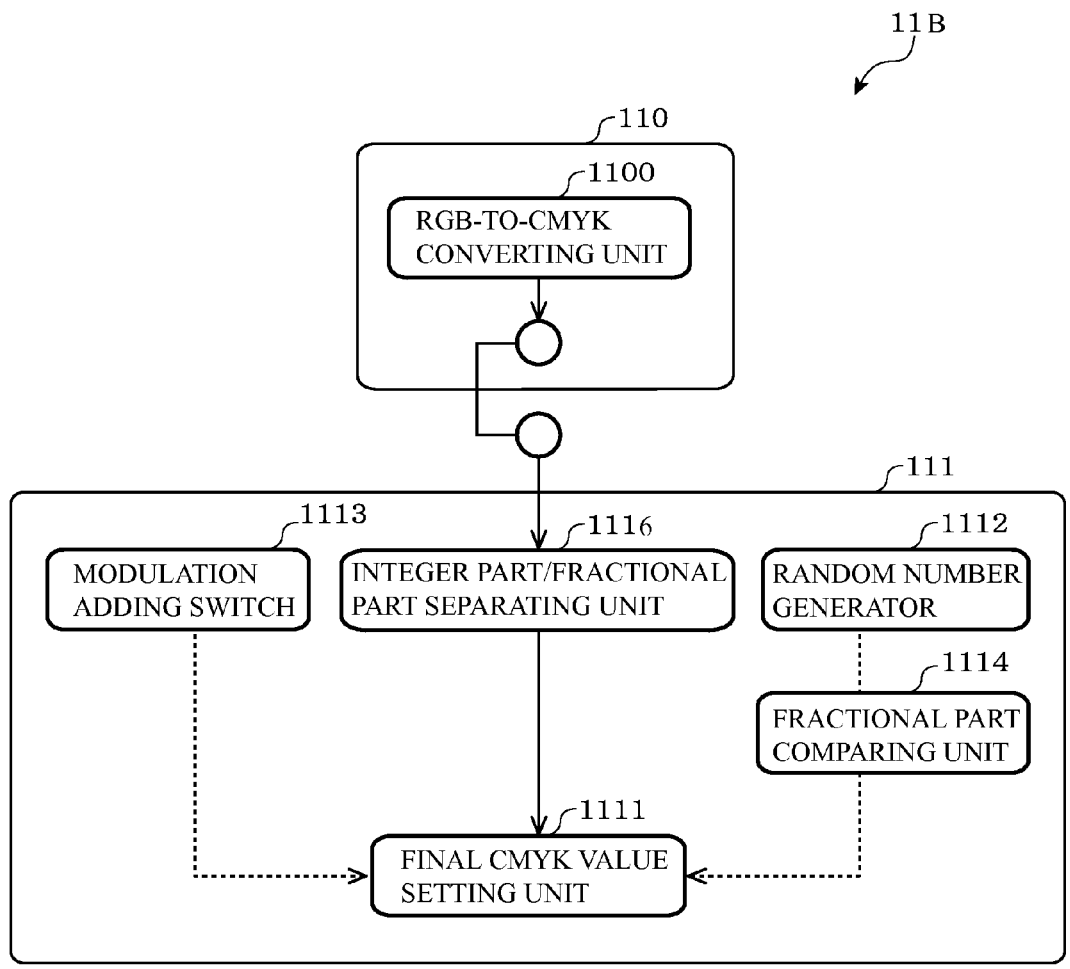
FIG. 3 shows a block diagram that illustrates a functional configuration of an image processing apparatus in a second embodiment of the present disclosure.

Next, the image processing apparatus 1 in a second embodiment of the present disclosure will be described. FIG. 3 shows a functional block diagram that illustrates the image processing apparatus in this embodiment of the present disclosure.

In the image processing apparatus 1 illustrated in FIG. 3, a control unit 11B includes the color conversion processing unit 110 and color value modulating unit 111 as in the first embodiment. The control unit 11B further includes a fractional part comparing unit 1114.

The color value modulating unit 111 includes an integer part/fractional part separating unit 1116, the final CMYK value setting unit 1111, the random number generator 1112, the modulation adding switch 1113, and the fractional part comparing unit 1114.

The integer part/fractional part separating unit 1116 separates a tentative output color value into an integer part and a fractional part. The integer part/fractional part separating unit 1116 then outputs the integer part to the final CMYK value setting unit 1111 and also outputs the fractional part to the modulation adding switch 1113.

The random number generator 1112 generates numerical values (decimal fractions) included in a range of 0 to 1 at random as random numbers that have almost no unevenness in that range. Random numbers are generated, for example, for each pixel on which to perform modulation. In addition, random numbers generated in succession for C, M, Y, and K are output to the fractional part comparing unit 1114.

The fractional part comparing unit 1114 compares the value (decimal fraction) of the fractional part received from the integer part/fractional part separating unit 1116 with the random numbers generated by the random number generator 1112. If the decimal fraction of the tentative output color value is larger than the random numbers, the fractional part comparing unit 1114 outputs a command to round down the decimal fraction to the final CMYK value setting unit 1111. If the decimal fraction of the tentative output color value is smaller than or equal to the random numbers, the fractional part comparing unit 1114 outputs a command to round up the decimal fraction to the final CMYK value setting unit 1111.

The final CMYK value setting unit 1111 modulates the tentative output color value in response to the command received from the fractional part comparing unit 1114. Specifically, upon receipt of a rounding-up command, the final CMYK value setting unit 1111 modulates the tentative output color value to a value obtained by rounding up the decimal fraction of the tentative output color value, that is, to a value obtained by adding one to the integer part of the tentative output color value. By contrast, upon receipt of a rounding-down command, the final CMYK value setting unit 1111 modulates the tentative output color value to a value obtained by rounding down the decimal fraction of the tentative output color value, that is, to the value of the integer part of the tentative output color value.

Since this rounding-up and rounding-down process is performed on each of C, M, Y, and K, one value is selected from actually 16 modulation candidates.

A Modulation process on a target pixel with a tentative output color value {C, M, Y, K} of, for example, {125.5, 133.2, 234.8, 58.1} will be described below.

In this example, the integer part is {125, 133, 234, 58} and the fractional part is {0.5, 0.2, 0.8, 0.1}. This example assumes that 0.11, 0.82, 0.45, and 0.61 have been obtained as random numbers in correspondence to C, M, Y, and K.

Since the decimal fraction (0.5) of the tentative output color value of C (cyan) exceeds the value (0.11) of its corresponding random number, the decimal fraction is rounded down, modulating the tentative output color value of C to 125.

When similar process is performed on M (magenta), Y (yellow), and K (black), the tentative output color values of M, Y, and K are modulated to 134, 234, and 59.

As a result, the tentative CMYK value {125.5, 133.2, 234.8, 58.1} of the target pixel is modulated to {125, 134, 234, 59}.

Instead of obtaining a random number for each channel as described above, a decision as to whether to perform rounding-up or rounding-down process may be made by using the same reference for all channels of the target pixel.

Now, an effect will be described that is obtained when the above modulation is performed on a portion in which the same color value (including a decimal fraction) continues.

An example will be described in which modulation is performed on an area in which 100 pixels with a tentative output color value {C, M, Y, K} of {125.5, 133.2, 234.8, 58.1} continue.

In this example, 100 random numbers, as many as the number of contiguous pixels, are obtained. Random numbers are obtained by generating decimal fractions included in a range of 0 to 1 so that they have almost no unevenness in that range. Since, in this example, the decimal fraction of the tentative output color value of K is 0.1, rounding-down for modulation is carried out with a probability ((1−0.1)/1=90%) of the random number exceeding 0.1.

Thus, it is possible to prevent contouring more efficiently when compared with a case in which modulation is performed simply by rounding off decimal fractions.

If, for example, decimal fractions are rounded off for modulation in the above example, all K values of the 100 contiguous pixels are rounded down and all color values obtained after the modulation have the same value (K=58). In this embodiment, however, 90 K values of the 100 contiguous pixels are rounded off and the remaining 10 K values are rounded up, so pixels with a K value of 58 and pixels with a K value of 59 coexist.

Accordingly, in modulation process in this embodiment, it is possible to prevent the occurrence of contouring efficiently even in a case in which pixels for which color values are the same particularly at a small decimal fraction continue.

The modulation adding switch 1113 determines whether or not to perform modulation in response to a user setting, as in the first embodiment described above.

As described above, the image processing apparatus 1 in the second embodiment modulates the tentative CMYK value to integer values by rounding up or down the decimal fraction of the tentative output color value of C, M, Y, and K according to the probability determined from the decimal fraction. Since output color values are changed to fine ranged randomized color values, it is possible to prevent the occurrence of contouring efficiently, which would otherwise be generated with the same consecutive color values.

Since color values are modulated according to a value equivalent to the minimum resolution of the output color value, a tradeoff between the prevention of contouring and lower image quality can also be eliminated. The image processing apparatus 1 in this embodiment can prevent the occurrence of contouring efficiently without lowering image quality.

III. Third Embodiment

Next, the image processing apparatus 1 in a third embodiment of the present disclosure will be described.

Figure 4:
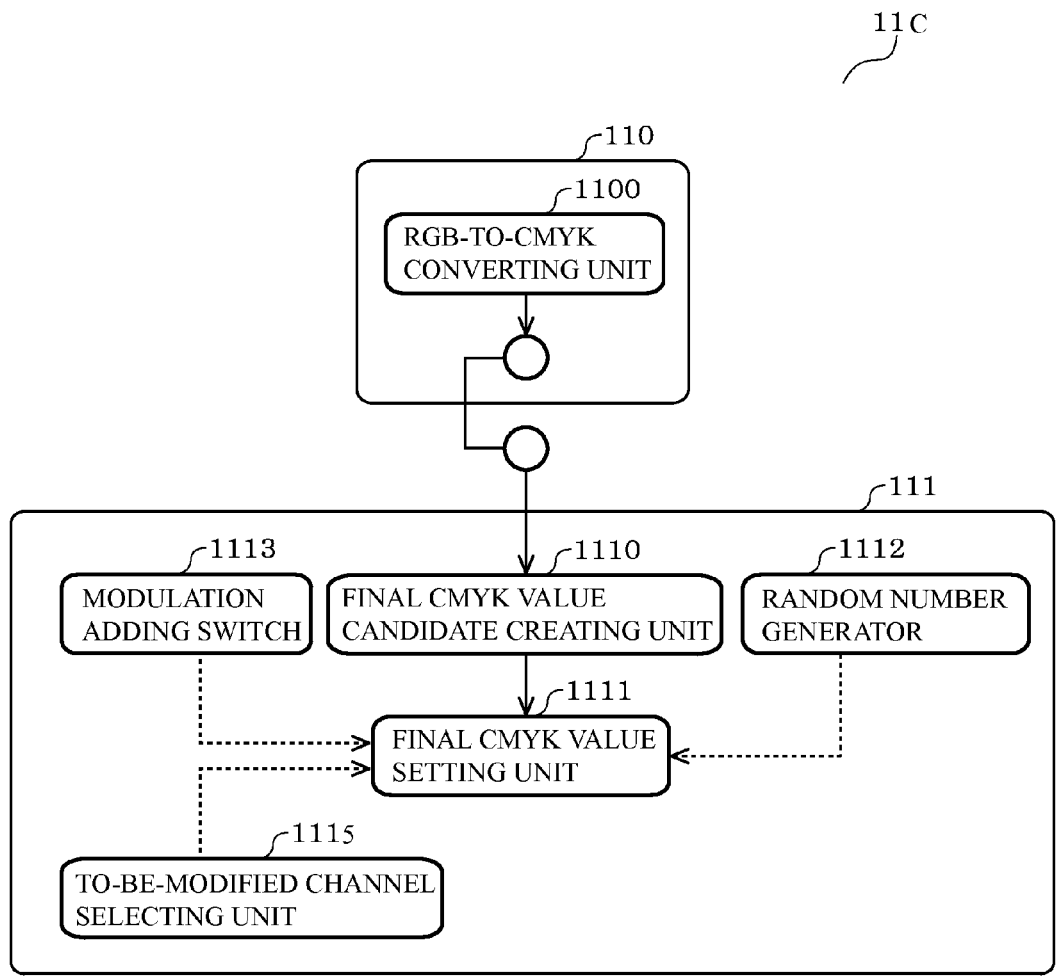
FIG. 4 shows a block diagram that illustrates a functional configuration of an image processing apparatus in a third embodiment of the present disclosure.

FIG. 4 shows a functional block diagram that illustrates the image processing apparatus in this embodiment of the present disclosure.

In the image processing apparatus 1 illustrated in FIG. 4, a control unit 11C includes the color conversion processing unit 110 and color value modulating unit 111 as in the embodiments described above. The control unit 11C in this embodiment further includes a to-be-modified channel selecting unit (color selecting unit) 1115.

The descriptions below will mainly focus on the to-be-modified channel selecting unit 1115, and detailed descriptions of the other constituent units will be omitted.

The to-be-modified channel selecting unit 1115 selects part or all of color components of a tentative color value in response to a selection manipulation by a user.

Figure 5:
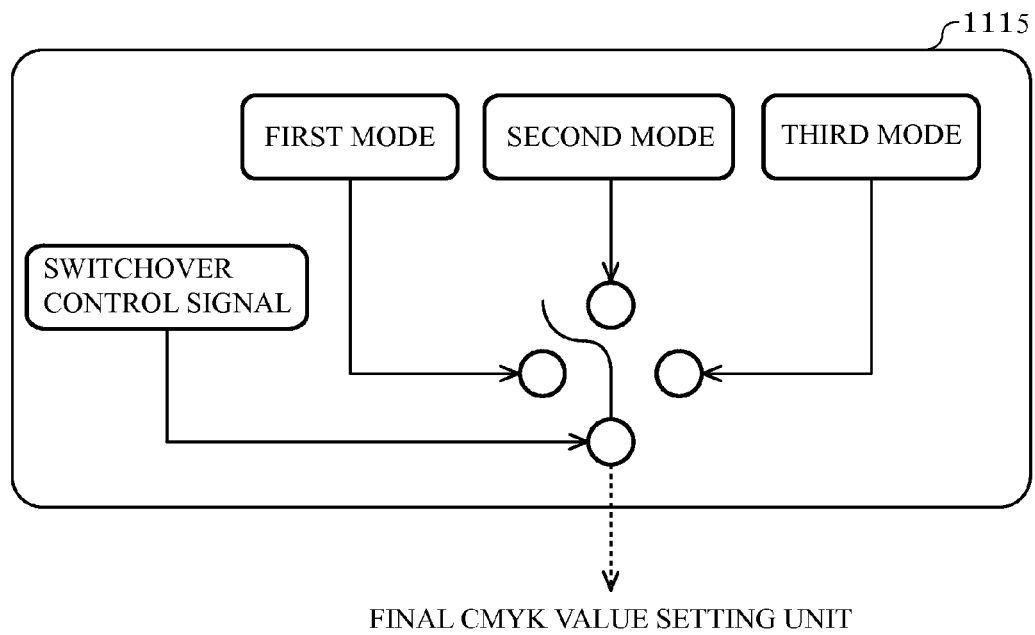
FIG. 5 illustrates a to-be-modulated channel selecting unit.

Specifically, modes that are enabled according to the selected channel are provided, as illustrated in FIG. 5. These modes are a first mode in which only the K channel is modulated, a second mode in which only the C, M, and Y channels are modulated, and a third mode in which all channels, C, M, Y and K, are modulated. The user can select any mode by performing a certain manipulation.

When a mode is selected and channels to be modulated are thereby selected, a switchover control signal including identification information about the selected channels is output to the final CMYK value setting unit 1111. The final CMYK value setting unit 1111 identifies channels to be modulated from the identification information and modulates only the tentative output color values of the identified channels.

A control signal including identification information may be output to the final CMYK value candidate creating unit 1110. In this case, the final CMYK value candidate creating unit 1110 creates modulation candidates only for the selected channels so that only the selected channels are modified.

If, for example, the first mode is selected, the final CMYK value candidate creating unit 1110 rounds up or down the decimal fractions of the tentative CMYK value only for the K channel to create a group of the integer values of the tentative CMYK value as modulation candidates. As a result, the following two modulation candidates are created.

{125, 133, 234, 58}, {125, 133, 234, 59}

If the second mode is selected, the final CMYK value candidate creating unit 1110 rounds up or down the decimal fractions of the tentative CMYK value only for the C, M, and Y channels to create a group of the integer values of the tentative CMYK value as modulation candidates. As a result, the following eight ($=2^3$) modulation candidates are created.

{125, 133, 234, 58}, {125, 133, 235, 58}, {125, 134, 234, 58}, {125, 134, 235, 58}, {126, 133, 234, 58}, {126, 133, 235, 58}, {126, 134, 234, 58}, {126, 134, 235, 58}

The final CMYK value setting unit 1111 selects one from these modulation candidates at random and performs modulation by replacing the tentative output color value with the selected modulation candidate.

The relevant image is output according to the color values obtained after the modulation and to the tentative output color values on which modulation has not been performed.

As described above, in the image processing apparatus 1 in the third embodiment of the present disclosure, since the control unit 11C includes the to-be-modified channel selecting unit 1115, a user can select a desired modulation method.

If a user wants to avoid hue modulation, for example, a user can select the first mode, in which modulation is not performed on the C, M and Y channels, to perform modulation only in a brightness direction.

If a user does not want a change in granularity or a large change in brightness, a user can select the second mode, in which modulation is not performed on the K channel, to perform desired modulation.

Although, in the above example regarding the third embodiment, a modulation method has been selected in the first embodiment, an arrangement can be made in the second embodiment to select a modulation method.

Accordingly, it is possible to provide the image processing apparatus 1 that not only has the same effect as in the embodiments described above but also is superior in users' convenience.

The present disclosure is not limited to the embodiments described above.

For example, the present disclosure can also be applied to image processing apparatuses other than printers and MFPs.

In the above embodiments, the RGB-to-CMYK converting unit 1100 uses a single LUT, in which input color values and output color values are directly associated, to perform color conversion process. However, the present disclosure is not limited to this; if output color values are finally obtained from the image processing apparatus 1, the present disclosure does not impose any particular limitations to the LUT configuration, processes in color conversion process, and the like.

Figure 6:
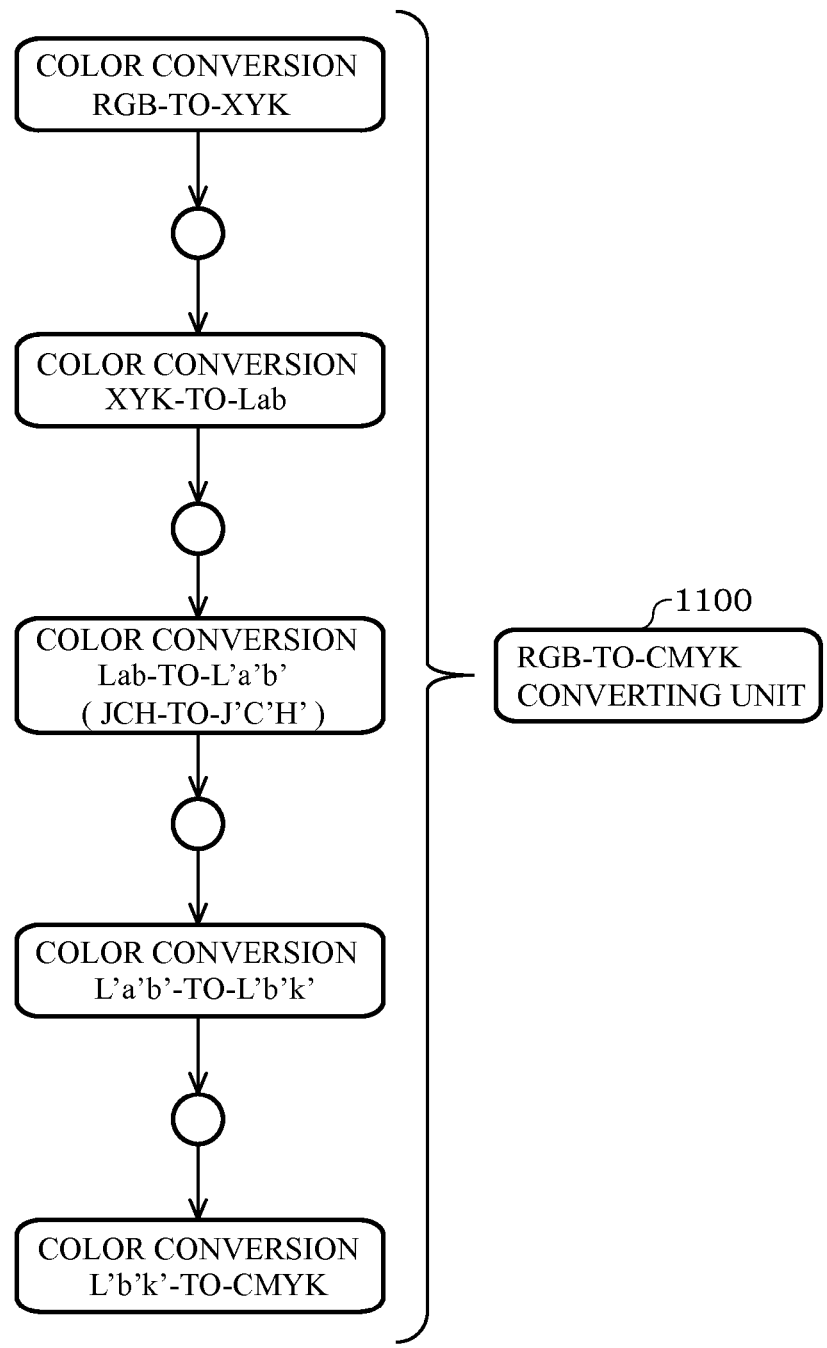
FIG. 6 illustrates another aspect of color conversion process.

For example, as illustrated in FIG. 6, color conversion from RGB values (input color values) to CMYK values (output color values) can be performed in several steps through LUTs used for color conversion to an XYZ color space and a Lab color space.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses and methods within the scope of the disclosure, in addition to those enumerated herein, will be apparent to those skilled in the art from the foregoing descriptions. Such modifications and variations are intended to fall within the scope of the appended claims. With respect to any or all of the ladder diagrams and flow charts in the drawings and as discussed herein, each block and/or communication may represent a processing of information and/or a transmission of information in accordance with example embodiments and alternative embodiments may be included within the scope of such example embodiments. Further, more or fewer blocks and/or functions may be used with any of the ladder diagrams and flow charts discussed herein, and these ladder diagrams and flow charts may be combined with one another, in part or in whole.

What is claimed is:

1. An image processing apparatus comprising:
a color conversion processing unit configured to perform color conversion from an input color value of a target image to a corresponding output color value to obtain a tentative output color value;
a modulation candidate creating unit configured to create modulation candidates, wherein the modulation candidates include combinations of integer values obtained by rounding a decimal fraction of each color component of the tentative output color value;
a color value modulating unit configured to select one of the modulation candidates at random and to perform modulation by replacing the tentative output color value with the selected modulation candidate;
an output unit configured to output an image according to a color value obtained after the modulation; and
a modulation adding switch configured to determine whether or not to perform modulation, wherein:
if a setting not to perform the modulation is determined, the output unit is configured to output the image according to the tentative output color value.

2. The image processing apparatus according to claim 1, further comprising a color selecting unit configured to select at least a portion of color components of the tentative color value in response to a selection manipulation, wherein
the color value modulating unit is configured to perform the modulation on the tentative output color values of the selected at least a portion of the color components; and
the output unit is configured to output the image according to color values obtained after the modulation and to the tentative output color values on which the modulation has not been performed.

3. The image processing apparatus according to claim 1, wherein the color conversion processing unit is an RGB-to-CMYK converting unit.

4. The image processing apparatus according to claim 1, further comprising an integer-fractional separating unit configured to separate the tentative output color value to an integer part and a fractional part.

5. The image processing apparatus according to claim 4, further comprising:
a random number generator configured to generate a random number; and
a fractional part comparing unit configured to compare the fractional part of the tentative output color value with the generated random number.

6. The image processing apparatus according to claim 5, wherein
if the fractional part of the tentative output color value is greater than the generated random number, the fractional part comparing unit outputs a command to round down the tentative output color value to a nearest integer; and
if the fractional part of the tentative output color value is less than or equal to the generated random number, the fractional part comparing unit outputs a command to round up the tentative output color value to a nearest integer.

7. The image processing apparatus according to claim 1, further comprising a to-be-modified channel selecting unit configured to select at least one of the color components of the tentative output color value in response to a predetermined mode.

8. An image processing apparatus comprising:
a color conversion processing unit configured to perform color conversion from an input color value of a target image to a corresponding output color value to obtain a tentative output color value;
a color value modulating unit configured to modulate the tentative output color value to integer values by rounding a decimal fraction of each color component of the tentative output color value according to a probability determined from the decimal fraction;
an output unit configured to output the image according to the color value obtained after the modulation; and
a modulation adding switch configured to determine whether or not to perform modulation in response to a setting manipulation, wherein
if a setting not to perform the modulation is made, the output unit is configured to output the image according to the tentative output color value.

9. The image processing apparatus according to claim 8, further comprising a color selecting unit configured to select at least a portion of color components of the tentative color value in response to a selection manipulation, wherein:
the color value modulating unit is configured to perform the modulation on the tentative output color values of the selected part or all of color component; and
the output unit is configured to output the image according to color values obtained after the modulation and to the tentative output color values on which the modulation has not been performed.

10. The image processing apparatus according to claim 8, wherein the color conversion processing unit is an RGB-to-CMYK converting unit.

11. The image processing apparatus according to claim 8, further comprising an integer-fractional separating unit configured to separate the tentative output color value to an integer part and a fractional part.

12. The image processing apparatus according to claim 11, further comprising:
a random number generator configured to generate a random number; and
a fractional part comparing unit configured to compare the fractional part of the tentative output color value with the generated random number.

13. The image processing apparatus according to claim 12, wherein
if the fractional part of the tentative output color value is greater than the generated random number, the fractional part comparing unit outputs a command to round down the tentative output color value to a nearest integer; and
if the fractional part of the tentative output color value is less than or equal to the generated random number, the fractional part comparing unit outputs a command to round up the tentative output color value to a nearest integer.

14. The image processing apparatus according to claim 8, further comprising a to-be-modified channel selecting unit configured to select at least one of the color components of the tentative output color value in response to a predetermined mode.

* * * * *